United States Patent [19]
Soltesz et al.

[11] Patent Number: 5,830,069
[45] Date of Patent: Nov. 3, 1998

[54] WIDE AREA NETWORKING GAMING

[75] Inventors: Andrew Soltesz; John Stiglic; Paul Mercia, all of Calgary, Canada

[73] Assignee: Wango World Inc., Calgary, Canada

[21] Appl. No.: 712,830

[22] Filed: Sep. 13, 1996

[51] Int. Cl.⁶ .................................................... A63F 9/22
[52] U.S. Cl. ............................................................. 463/42
[58] Field of Search ................................. 463/40, 41, 42, 463/30, 31, 9, 16, 29, 19, 20, 21; 273/269; 340/323 R

[56] References Cited

U.S. PATENT DOCUMENTS 5,518,253  5/1996  Pocock et al. ............................. 463/41
5,558,339  9/1996  Perlman ..................................... 463/41
5,586,937  12/1996  Menashe ................................... 463/41

*Primary Examiner*—George Manuel
*Attorney, Agent, or Firm*—Terry L. Leier; George E. Fisk

[57] ABSTRACT

The present invention provides for the transmission and conduct of a bingo game at more than one site, through the use of a private wide area network ("WAN"), on which participants are qualified and controlled. Each site has a PC computer, with peripheral equipment, which communicates on a WAN. This is done by the present invention with considerably less hardware setup cost at each location, and with a lower operating cost, than is found in the prior art. Access to the present invention is more easily controlled than under the video broadcast prior art, and unauthorized participants may be more easily excluded from participation.

31 Claims, 1 Drawing Sheet

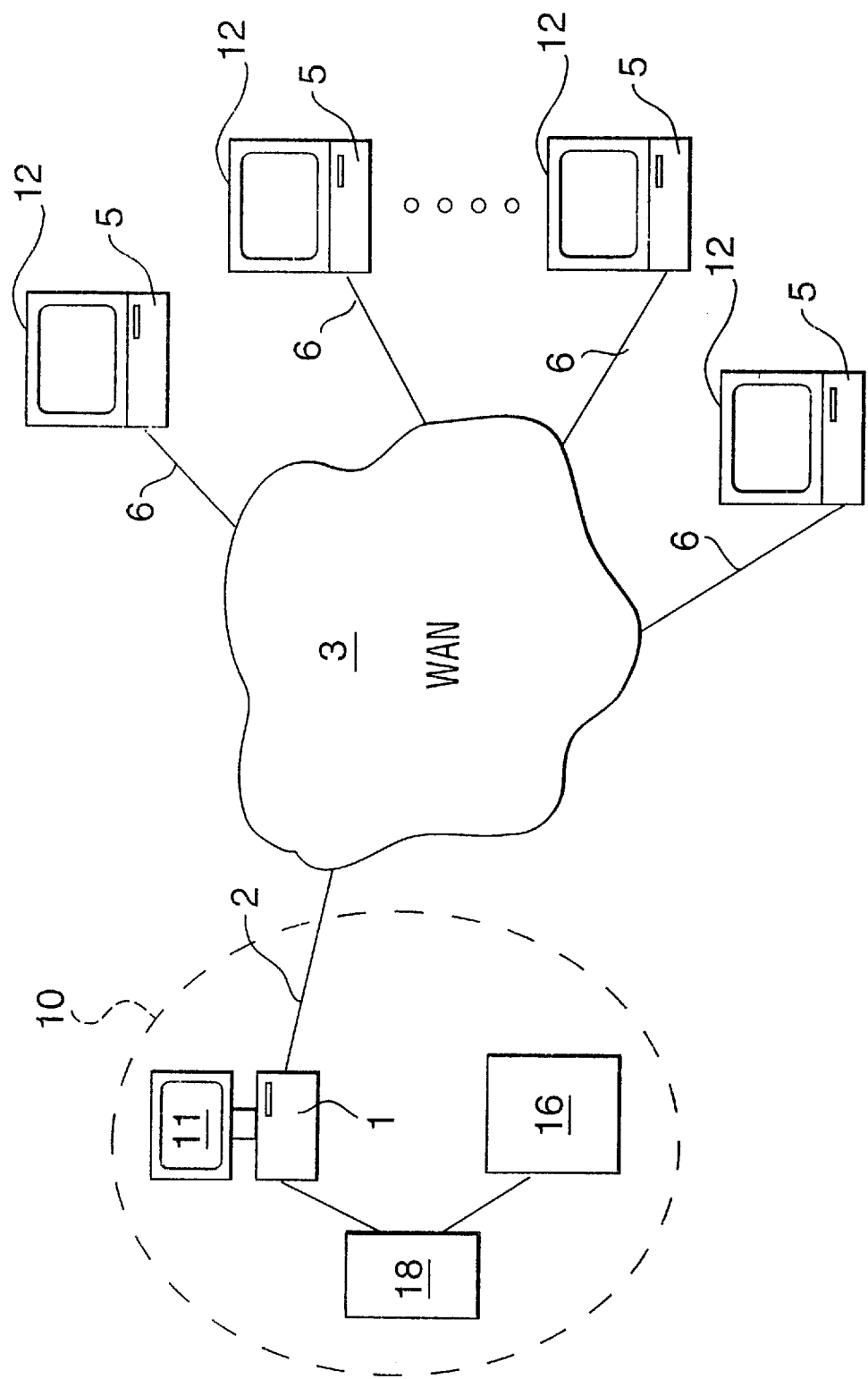

WIDE AREA NETWORKING GAMING

BACKGROUND OF THE INVENTION

The field of this invention is telecommunication systems. More specifically the invention relates to the conduct and transmission of gaming activities through a wide area network.

Gaming activities, such as bingo have been in the past conducted in gaming facilities and broadcast live by various means of telecommunication, primarily television and direct from broadcast satellite ("DBS") television. Direct full duplex satellite connections have been used to have the gaming activities conducted at multiple sites simultaneously in one integrated game. A problem with this prior art for multiple site gaming activities is that two-way satellite video broadcasts require expensive ground stations at all locations. With such systems, there is a considerable hardware and software setup cost at each location in addition to relatively high operation costs and royalties per game. Also, DBS and other television broadcast technology allows for unauthorized reception under some circumstances, which is not desirable for gaming activities.

SUMMARY OF THE INVENTION

It is an object of the present invention to provide a superior means to conduct multi-site integrated gaming activities, and to transmit coverage in real time with pictures and audio of gaming activities, with reduced hardware cost per site, and reduced operating cost per game.

It is a further object of the present invention to provide such gaming activity telecommunication services in a way that tightly restricts participation to qualified participants. This allows games to be run pursuant to the tight regulatory environment in which legitimate commercial gaming activities take place in many jurisdictions.

The present invention provides for the transmission and conduct of a gaming activity at more than one site, through the use of a private wide area network ("WAN"), on which participants are qualified and controlled. Each site has a PC computer, with peripheral equipment, which communicates on the WAN. This is done by the present invention with considerably less hardware setup cost at each location, and with a lower operating cost, than is found in the prior art. Access to the present invention is more easily controlled than under the video broadcast prior art, and unauthorized participants may be more easily excluded from participation.

BRIEF DESCRIPTION OF THE DRAWING

The FIGURE shows a schematic drawing of the basic architecture of the hardware of the present invention.

DESCRIPTION OF THE PREFERRED EMBODIMENT

The present invention provides the conduct of gaming activities at more than one site simultaneously using any of a variety of configurations of wide area networks ("WANs") with access restricted to qualified participants. Various links in the WANs may be used in any of the various possible WAN configurations and hardware platforms, including data lines, coaxial cable, land telephone lines, mobile phone lines, cellular phone lines, DBS direct broadcast satellite systems, digital and/or analog formats, Internet connections, or other WAN links yet to be developed. Because participation in the system can be controlled to qualified participants, participants will be restricted from locations in jurisdictions that will not permit gaming in this or any other manner.

FIG. 1 shows a schematic drawing of the fundamental architecture of the current embodiment. There is a central site 10 at which the central control of the gaming activity is conducted, including the location and operation of the gaming machine, such as the number selection machine if the gaming activity is bingo. The central site PC computer 1 is connected by a link 2 to a WAN system 3. A display 11 is optionally provided in connection with central site PC 1. Any WAN system configuration can be used. Connected to the WAN system are one or more other sites, which can be remote from central site 10. Each site includes a site PC computer 5, having a display unit 12 associated therewith, connected to the WAN 3 by a link 6.

Each site PC 5 is controlled and qualified to legitimately participate in the gaming operation in its physical location and in its jurisdiction. Each site with a site PC 5 has game participants. Such sites may be other meeting halls, smaller auxiliary facilities, an individual home, or other locations. Central site 10 may be a meeting hall with participants, or merely a facility without participants but with central control of the game and the location of the gaming machinery, and means for a verifying a winner, such as a participant who achieves bingo.

Where a link 2 and/or 6 is over a telephone line, then a modem of ratio of 1:1 is anticipated. Where an ISDN hookup is used, the connection is direct and modems are not required. If a cable hookup is used, then a cable modem may be used.

If a Virtual T-1 WAN connection as provided by Cybersurf Internet Access, of Alberta, Calgary, Canada, a 28.8 kps (kilobits per second) modem is anticipated at each site. The minimum specification for a computer to support the connection would be a 286 chip machine supporting pictures.

If a SLIP/PPP connection is used, then a 28.8 kps modem is anticipated, with a minimum computer requirement of a 486 chip with picture and audio capability.

Where an ISDN line is used, the link would be direct with a 486 chip computer providing pictures, video and audio. The same would be the circumstance with an actual T-1, T-2 or T-3 connection. If a VSAT link is used, then a direct satellite link would be provided with a 486 PC computer providing pictures, video and audio.

Live gaming activity presentation from a central originating location with a central site PC 1 to participants at one or more sites with site PCs 5 would support real time participation in one gaming activity from a plurality of locations including audio and visual communication.

The system may be supported on 286 chip PC computer using the Cybersurf Virtual T-1 technology for the WAN 3, at the low end. At the high end, as new technologies emerge and are implemented, the system may be provided with digitized video and audio in combination with digitized pictures. This will be facilitated in the future with a general availability of ISDN lines in a larger number of areas.

Connections to links 2 and 6 on WANs will not be limited to but may include protocols such as PPP, SLIP, TCPIP, and Virtual T-1 by Cybersurf.

The hardware connections for links 2 and 6 may include standard twisted copper pair telephone lines, fiber optic telephone lines, ISDN lines, T-1 lines, T-2 lines, T-3 lines, VSAT, CATV, and CCTV.

Regarding the equipment requirements of the central site PC 1 server for the WAN 3 at the central site, the requirements of the preferred embodiments depend in part on the nature of the links 2 and 6 and protocols used by the WAN 3. For ISDN connections, central site hardware requirements would be, in a preferred embodiment, an Xpressway Central 11 computer segmented with redundant PSU power supply, a RLAN-RSC 9000 controller (controlling the ISDN data), a RLAN-RAC 3.2 software kit, RLAN-BRI 9308 ports (for the ISDN ports), and a UTP Ethernet Hub (to plug devices into).

For PPP protocol (point to point protocol) connections, the central server requirements would include an Xpressway Central 11 computer segmented with redundant PSU, GTS plus with 10 cards, RJ 452VB25 cable, a UTP Ethernet Hub, and a GVC modem rack with 32 modems at 28.8 kps.

For Cybersurf Virtual T-1 server technology (VT-1 connections) the central site requirements would be a terminal server, Cybersurf software, cables with RJ452BB25 cable, a UTP Ethernet Hub, and a GVC modem rack with 32 modems at 28.8 kps.

In the preferred embodiment, the multi-site bingo game is conducted on a private WAN system. All users, to log on to the WAN from each site 1 and 5, need a password and log in information prior to beginning the session. The system is not accessible through a public network. Participants are required to contact the central server PC 1 at the central site by phone or have a direct hookup through ISDN lines.

Prior to the event all participants log onto the system at least an hour prior to the game. Bingo cards for the night are sold and the cash totals from each participation site are sent to the central control at the central site by the WAN 3. Alternatively, totals can be called in by a telephone land line to the central site from the participation sites. A pregame screen drawing is attached to show a typical pre-bingo event on the computers 1 and 5 connected to the WAN 3. The screen shows the date, the time remaining until the drawing begins, emergency phone numbers and current status of the jackpot for the game. Five minutes before the game starts, card purchases are cut off and the final total of sales are communicated to the central site PC 1, from the participation site PC 5. Any totals received are counted in the jackpot draw.

A totally automated bingo machine 16 is used at the central PCs 5 to randomly select the bingo balls on which the bingo numbers are inscribed. Each bingo ball is randomly selected by the bingo ball selection machine 16 and the drawing of each ball is captured on video at the central site PC 1 by a video system 18 and transmitted through the WAN 3 to each participation site PC 5. The video picture is digitized and the digitized picture is compressed as a picture file and sent through the WAN 3 from the central site PC 1 to each participation site PC 5. The picture at the participation site PC 1 is redrawn at each of the site computers 5 and projected as a video picture on a screen 12 at the participation site.

Depending on the hardware system available at each participation site PC 5, live video is compressed by a compression program in central site PC 1 and transmitted in real time from the central site PC 1. Using a computer of adequate power, digital video images are transmitted on the WAN 3. The video would complement the still frames that were simultaneously transmitted.

When a bingo is announced by a player in any participation site, the location with the player achieving a bingo has the option to press a bingo virtual button on the screen of the site computer 5 connected to the WAN 3 at the site, or directly calling on a land line to the central site PC 1. Verification of the bingo is done at the central site while the game is stopped. Verification of the bingo card done by calling the central control by a land line and communicating the serial number of the bingo card, or by entering the serial number of the card in the central site computer 1 on the WAN 3 at the central site.

The present invention would at a minimum deliver high quality still graphics and video pictures on a quarter screen. Where the site computer 5 connected to the WAN 3 at the participation site has adequate power, then digitized video may be transmitted, either alone or as a complement to the stills. The present invention is fully interactive through the WAN 3 with possible augmentation through telephone lines. The present invention is not negatively impacted by the weather, and experiences signal degradation only in the event of noisy phone lines.

It is anticipated that hardware and software packages for a participation site PC 5 to connect with WAN 3 and communicate with the central site PC 1 in the present system can be prepackaged and shipped in a plug ready installation mode, not required expert installation.

In one embodiment, the least expensive hardware for a participation includes a 286 computer and Cybersurf T-1 access and 28 MB of RAM. In another embodiment, the site equipment includes a 486 PC with 66 MHz or better.

Yet another embodiment of the present invention contemplates a site package including a Pentium chip and PPP access with a participation site PC 5 client with a minimum of a 486 machine with 16 MB RAM and 66 MHz and a sound card. This can be provided with a reasonable fixed cost and at a relatively modest monthly cost.

A still further embodiment of the present invention includes a site package with a Pentium chip and an ISDN capacity, assuming a client with a minimum 486, 16-MB of RAM, at 66 MHz and a sound card. This would have slightly higher fixed and monthly costs than the previous embodiment.

An augmented system with additional hardware from the central server can also be provided.

The embodiments illustrated and discussed in the specification are intended only to teach those skilled in the art the best way known by the inventors to make and use this invention. Nothing in the specification should be considered as limiting the scope of the present invention. Many changes could be made by those skilled in the art to produce equivalent systems without departing from the invention. The present invention should be limited only by the following claims and their legal equivalents.

For ease of expression, bingo is referred to herein as the game conducted. However, other games can also be played, and fees charged, or bets made, including without limitation, keno, roulette, dice games, ma jong, jai lai, horse racing, dog racing, lotteries, slot machines, baseball, football, golf, basketball, fantasy sports leagues and fantasy sports games, and card games which may include poker, black jack, solitaire, and baccarat.

The participation of the participants may include paying game participation fees (such as buying bingo cards), betting on the outcome of the game, and taking roles in the game (such as covering the bingo card and declaring bingo or picking a roulette number).

The preferred embodiment uses PCs. However, the invention can be practiced with a variety of programmable electronic equipment including work stations, minicomputers, mainframes, ASICs, and programmable circuits.

The present invention is not limited to PCs with particular chips, such as Intel based chips, or operating systems, such as DOS or Windows by Microsoft, although these chips and operating systems are used in the preferred embodiment. For example, Power PC chips, and AIX or OS2 operating systems can be used in the PCs. Any type of PC chip or operating system that provides adequate operating characteristics can be used for the PCs.

The preferred embodiment uses PCs. However, the invention can be practiced with a variety of programmable electronic equipment including work stations, minicomputers, mainframes, ASICs, and programmable circuits.

We claim:

1. A system comprising:
   a. a central site PC located at a central site with gaming control controlling a gaming event,
   b. a WAN connected to the central site PC through a first telecommunications link,
   c. at least one participation site with at least one participant and a participation site PC at each such participation site, each participation site PC communicating to the WAN through its own telecommunications link,
   d. each participation site PC communicating through the WAN, to the central site PC, and the central site PC communicating through the WAN with each participation site PC,
   e. the central site PC communicating video and non-video information of the gaming event to each participation site PC through the WAN, and
   f. the participation site PCs each communicating information regarding the participation of the participants in the gaming event to the central site PC through the WAN.

2. The system of claim 1, where:
   a. the gaming event is bingo, and
   b. bingo players are at the central site and at the participation sites.

3. The system of claim 2, further comprising:
   a. an automated bingo machine is used at the central site PC to randomly select bingo balls on which bingo numbers are inscribed, and
   b. a video system wherein the drawing of each bingo ball selected by the automated bingo machine is captured on video at the central site and transmitted through the WAN to each participation site PC.

4. The system of claim 3, the central site PC including:
   a. means for digitizing the video into a digitized signal,
   b. means for compressing the digitized signal as a picture file, the picture file being sent through the WAN from the central site PC to each participation site PC, and
each participation site PC including:
   a. means for reproducing the video from the picture file, and
   b. means for projecting the video on a screen.

5. The system of claim 1, where the gaming event is one selected from the list comprising: bingo, keno, roulette, dice games, ma jong, jai lai, horse racing, dog racing, lotteries, slot machines, baseball, football, golf, basketball, fantasy sports leagues and fantasy sports games, and card games which may include poker, black jack, solitaire, and baccarat.

6. The system of claim 1, where the participation of the participants are actions selected from the group comprising: paying gaming event participation fees, betting on the outcome of the gaming event, and playing roles in the gaming event.

7. The system of claim 1, where each of the first telecommunications link and the telecommunication link to each participation site PC is a link selected from the group comprising a standard twisted copper pair telephone line, a fiber optic telephone line, an ISDN line, a T-1 line, a T-2 line, a T-3 line, VSAT, CATV, and CCTV.

8. The system of claim 7, where the first telecommunications link and the telecommunication link to each participation site PC is in a digital format.

9. The system of claim 1, where digitized video and audio in combination with digitized pictures is transmitted through the WAN between the central site PC and the participation site PCs.

10. The system of claim 1, where connection to the first telecommunications link and the connection to the telecommunication link to each participation site PC include protocols selected from the group comprising PPP, SLIP, TCPIP.

11. The system of claim 1, where:
   a. an ISDN connection connects the central site PC to the WAN, and
   b. the central cite PC includes an Xpressway Central 11 computer segmented with a redundant PSU power supply, a RLAN-RSC 9000 controller, a RLAN-RAC 3.2 software kit, RLAN-BRI 9308 ports, and a UTP Ethernet Hub.

12. The system of claim 1, where:
   a. a PPP connection connects the central site PC to the WAN, and
   b. the central cite PC includes an Xpressway Central 11 computer segmented with redundant PSU, a GTS plus with 10 cards, an RJ 452VB25 cable, a UTP Ethernet Hub, and a GVC modem rack with 32 modems at 28.8 kps.

13. The system of claim 1, where:
   a. the central site PC and the participation site PC log onto the WAN using a password and log in information prior to beginning a gaming session.

14. The system of claim 1, where:
   a. the central site PC provides pregame information to each participation site PC causing at least one screen at each participation site to show a current date, time remaining until a gaming session begins, and current status of a jackpot for a game to be conducted.

15. A method of conducting a gaming activity comprising the steps of:
   a. controlling a gaming event with a central site PC located at a central site, the central site PC communicating over a WAN connected to the central site PC through a first telecommunications link,
   b. providing at least one participation site with at least one participant and a participation site PC at each such participation site, each participation site PC communicating to the WAN through its own telecommunications link, and
   c. communicating between the central site PC and each participation site PC communicating through the WAN, the central site PC communicating video and non-video information of the gaming event to each participation site PC through the WAN, and the participation site PCs each communicating information regarding the participation of the participants in the gaming event to the central site PC through the WAN.

16. The method of claim 15, where:
   a. the gaming event is bingo, and
   b. bingo players are at the central site and at the participation sites.

17. The method of claim 16, further comprising the steps of:
 a. randomly selecting bingo balls, on which bingo numbers are provided, using an automated bingo machine at the central site PC,
 b. capturing an image of each bingo ball drawn at the central site selected by the automated bingo machine using a video system, and
 c. transmitting the image to each participation site PC through the WAN.

18. The method of claim 17, further comprising the steps of
 a. digitizing the image into a digitized signal,
 b. compressing the digitized signal as a picture file,
 c. sending the picture file through the WAN from the central site PC to each participation site PC,
 d. reproducing the image at each participation site from the picture file, and
 e. projecting the video on a screen at each participation site.

19. The method of claim 16, further comprising the step of:
 a. selling bingo cards for a gaming session and sending cash totals from each participation site the central site via the.

20. The method of claim 16, further comprising the steps of:
 a. initiating a communication from a participation site if a bingo is announced by a player at that participation site, and
 b. verifying the existence of the bingo at the central site.

21. The method of claim 15, where the gaming event is one selected from the list comprising: bingo, keno, roulette, dice games, ma jong, jai lai, horse racing, dog racing, lotteries, slot machines, baseball, football, golf, basketball, fantasy sports leagues and fantasy sports games, and card games which may include poker, black jack, solitaire, and baccarat.

22. The method of claim 15, where the participation of the participants are actions selected from the group comprising: paying gaming event participation fees, betting on the outcome of the gaming event, and playing roles in the gaming event.

23. The method of claim 15, where each of the first telecommunications link and the telecommunication link to each participation site PC is a link selected from the group comprising a standard twisted copper pair telephone line, a fiber optic telephone line, an ISDN line, a T-1 line, a T-2 line, a T-3 line, VSAT, CATV, and CCTV.

24. The method of claim 23, where the first telecommunications link and the telecommunication link to each participation site PC is in a digital format.

25. The method of claim 15, where digitized video and audio in combination with digitized pictures is transmitted through the WAN between the central site PC and the participation site PCs.

26. The method of claim 15, where connection to the first telecommunications link and the connection to the telecommunication link to each participation site PC include protocols selected from the group comprising PPP, SLIP, TCPIP.

27. The method of claim 15, where:
 a. an ISDN connection connects the central site PC to the WAN, and
 b. the central cite PC includes an Xpressway Central 11 computer segmented with a redundant PSU power supply, a RLAN-RSC 9000 controller, a RLAN-RAC 3.2 software kit, RLAN-BRI 9308 ports, and a UTP Ethernet Hub.

28. The method of claim 15, where:
 a. a PPP connection connects the central site PC to the WAN, and
 b. the central cite PC includes an Xpressway Central 11 computer segmented with redundant PSU, a GTS plus with 10 cards, an RJ 452VB25 cable, a UTP Ethernet Hub, and a GVC modem rack with 32 modems at 28.8 kps.

29. The method of claim 15, further comprising the step of:
 a. logging onto the WAN from the central site PC and the participation site PC using a password and log in information prior to beginning a gaming session.

30. The method of claim 15, further comprising the step of:
 a. logging each participation site PC onto the WAN at least an hour prior to beginning a gaming session.

31. The method of claim 15, further comprising the step of:
 a. providing, via the central site PC, pregame information to each participation site PC causing each screen at each participation site showing a current date, time remaining until a gaming session begins, and current status of a jackpot for a game to be conducted.

* * * * *